United States Patent [19]
Frew et al.

[11] Patent Number: 6,009,456
[45] Date of Patent: Dec. 28, 1999

[54] INFORMATION EXCHANGE BY INTELLIGENT MOBILE AGENTS IN A NETWORK

[75] Inventors: Russell Ernest Frew; Kenneth Robert Whitebread, both of Medford; Henry Hindle Mendenhall, Shamong, all of N.J.

[73] Assignee: Lockheed Martin Corp., Camden, N.J.

[21] Appl. No.: 08/903,346

[22] Filed: Jul. 30, 1997

[51] Int. Cl.$^6$ .......................... G06F 13/00; G06F 15/163
[52] U.S. Cl. ........................... 709/202; 709/247
[58] Field of Search .................. 395/200.32, 200.77; 709/202, 247

[56] References Cited

U.S. PATENT DOCUMENTS

| | | | |
|---|---|---|---|
| 5,499,364 | 3/1996 | Klein et al. | 395/200.03 |
| 5,603,054 | 2/1997 | Theimer et al. | 395/826 |
| 5,638,494 | 6/1997 | Pinard et al. | 395/60 |
| 5,655,081 | 8/1997 | Bonnell et al. | 395/200.32 |
| 5,768,506 | 6/1998 | Randell | 395/200.32 |
| 5,822,585 | 10/1998 | Noble et al. | 395/680 |
| 5,850,517 | 12/1998 | Verkler et al. | 395/200.32 |

OTHER PUBLICATIONS

"Intelligent Agents: The First Harvest of Softbots Looks Promising", Sara Reese Hedberg, IEEE Expert, Aug. 1995, pp. 6–9.

"Harnessing the World Wide Web", Jay Allen Sears, US Advanced Reserach Projects Agency, IEEE Expert, Aug. 1995, pp. 42–43.

"Intelligent Agents on the Internet: Fact, Fiction, and Forecast", Oren Etzioni and Daniel S. Weld, University of Washington, IEEE Expert. Aug. 1995 pp. 44–49.

"AI on the WWW—Supply and Demand Agents", Carol Brown, Oregon State University; Les Gasser and Daniel E. O'Leary, University of Southern California; Alan Sangster, University of Aberdeen, IEEE Expert, Aug. 1995, pp. 50–55.

"Telescript Technology: Mobile Agents", James E. White, General Magic, Inc., American Association for Artificial Intelligence, 1996 pp. 1–38.

*Primary Examiner*—Lance Leonard Barry, Esq.
*Attorney, Agent, or Firm*—W. H. Meise

[57] ABSTRACT

Intelligent mobile agents in a distributed network carry information tokens among network nodes. Each token includes compressed information or data, and an indication of the compression algorithm which can decompress the information. At least some of the nodes have at least one decompression algorithm. A copy of a token may be left at a node by an intelligent mobile agent moving through the network. A later-arriving intelligent mobile agent can interrogate the node to determine what information it has in the form of tokens, and can use the token information, or take the token (or a copy) elsewhere.

4 Claims, 7 Drawing Sheets

INFORMATION EXCHANGE BY INTELLIGENT MOBILE AGENTS IN A NETWORK

FIELD OF THE INVENTION

This invention relates to distributed networks of computers linking computing and data resources, and more particularly to such networks which utilize cooperating intelligent mobile agents for performing complex tasks in the presence of limited network bandwidth.

BACKGROUND OF THE INVENTION

Distributed communication systems or networks are now widely used. Such communications systems may be widely distributed information sources such as local- or wide-area networks, corporate or military communication systems, or the world-wide computerized interactive communication system known as the internet. Such communication systems can be used to access remote information or computing resources. When using such systems, it is necessary to know the location or address of the information being sought or of the computing resource to be used, or the user must carry out a search procedure to locate the information. In the case of very large distributed systems which are not indexed, the search is so extensive or time-consuming that it may be impractical, and may therefore not be attempted.

There has been interest in the use of intelligent mobile agents for overcoming some of the problems associated with searches of distributed, possibly unindexed, data bases or computing resources. An intelligent mobile agent is a computer program which can independently or semi-independently perform tasks which the operator could not perform on his own because of the time or effort required for the task. For example, an intelligent mobile agent might be used to discover information autonomously, or under its own control, because the operator or user of the distributed communication system might not be aware of the existence of a source of useful information, or of its address if its existence were known. The mobile intelligent agent is a computer-type program characterized by the ability to move over the communication system from one computer to another while the program is "running"; in fact, it is necessary for it to do so in order to perform its tasks. This does not, of course, mean that the bit pattern of the program changes while it is in transit from one computer to the other, but rather means that, in performing its tasks or "running," the program moves its location from one computer to another. Intelligent mobile agents or "softbots" are described in the following references:

1) "*Intelligent Agents: The First Harvest of Softbots Looks Promising*", Sara Reese Hedberg, IEEE Expert.
2) "*Harnessing the World Wide Web*", Jay Allen Sears, US Advanced Research Projects Agency, IEEE Expert.
3) "*Intelligent Agents on the Internet: Fact, Fiction, and Forecast*", Oren Etzioni and Daniel S. Weld, University of Washington, IEEE Expert.
4) "*AI on the WWW—Supply and Demand Agents*", Carol Brown, Oregon State University; Les Gasser and Daniel E. O'Leary, University of Southern California; Alan Sangster, University of Aberdeen, IEEE Expert.
5) "*Telescript Technology: Mobile Agents*", James E. White, General Magic, Inc., American Association for Artificial Intelligence.

One problem which has been found with the use of such mobile agents for seeking information on a distributed computing or knowledge base is that the capability of the agent is more or less related to the size or complexity of the program which embodies the intelligent mobile agent, so that a highly capable mobile agent, just like a highly capable computer program of any sort, tends to be very large in terms of the number of bytes which it contains. Thus, autonomous agents which maintain their state over time, and which are not totally "scripted" and therefore are knowledge-based or "learning" programs, as are the domains of knowledge about which they maintain an understanding, tend to be quite large. The length of time required to transmit the intelligent mobile agent from one computer to another (from one "site" or network "node" to another) over the communication system depends upon the bandwidth of the system in bits or bytes per second. It may not be practical to use a highly capable intelligent mobile agent, because the large size of such an agent requires excessive computer-to-computer transmission time. If the bandwidth of the distributed communication system can be controlled, then its bandwidth can simply be expanded in order to accommodate the desired mobile agents at the desired speed. Ordinarily, the communication system or data base is a given, and its bandwidth cannot be controlled. It should be noted here that limitations in the bandwidth of a part of a computer which interacts at a network node with the communication system will have the same effect, as to that computer, as a limitation of the bandwidth of the communication system itself; it is therefore desirable to use the highest possible speed modem at each computer site. Under bandwidth-limited conditions, the use of a highly capable intelligent mobile agent may result in excessive transmission time delays, and these directly impact the time required for the intelligent mobile agent to perform a search. The amount of time which is considered to be excessive may depend upon the information sought and its importance. If search time is irrelevant, a highly capable intelligent mobile agent may be used on a low-bandwidth distributed computing system or network. Ordinarily, however, large transmission times are undesirable because of the resulting delays in receiving the search results, especially in those cases in which real-time information is sought. Thus, if a very complex search is required to find the desired information, a highly capable intelligent mobile agent capable of performing the search may be too large to be practical under given circumstances. The inability to quickly transmit highly capable intelligent mobile agents tends to prevent full utilization of the resources of the communication system.

U.S. patent application Ser. No. 08/741,759, filed Nov. 5, 1996 in the name of Whitebread et al., describes a scheme for improving the resource utilization in limited bandwidth communication systems. As described generally therein, a distributed communication network includes a plurality of computers, and communication paths for coupling the computers together at nodes of the network for communications therebetween. The network also includes standardized computer network software associated with each of the computers, for providing basic network communications between or among the computers; this may be software suitable for use with a world-wide communication system commonly known as "internet." The network according as described in the Whitebread et al. application also includes a mobile agent generating program located at one or more of the computers of the network, for generating, and for transmitting over the communication network to at least one other computer of the network, agents for performing a desired function. The dimensions (size) of a mobile agent are related to its capability, whereby highly capable agents may be so large as not to be usable, because of network bandwidth limitations. A mobile agent docking arrangement is located at each computer or node of the network, which capability expander is capable of coacting with the mobile agents, for rendering the agents active at that computer. A mobile agent capability expander is located at, or associated with, at least one of the computers of the network which is capable of coacting with mobile agents, for extending at least one capability of a mobile agent. This enhances the capability of mobile agents used in the system without expanding limited network bandwidth. The information embodying the capability enhancement or expander may be transmitted over the communication network to the agent-receiving computer(s) at infrequent intervals, during which the communication network is otherwise lightly loaded, so that the capability expander is available at such later time at which a mobile agent arrives. The capability enhancement may instead be uploaded to the agent-receiving computer(s) from a portable memory, such as a floppy disk.

Figure 1:
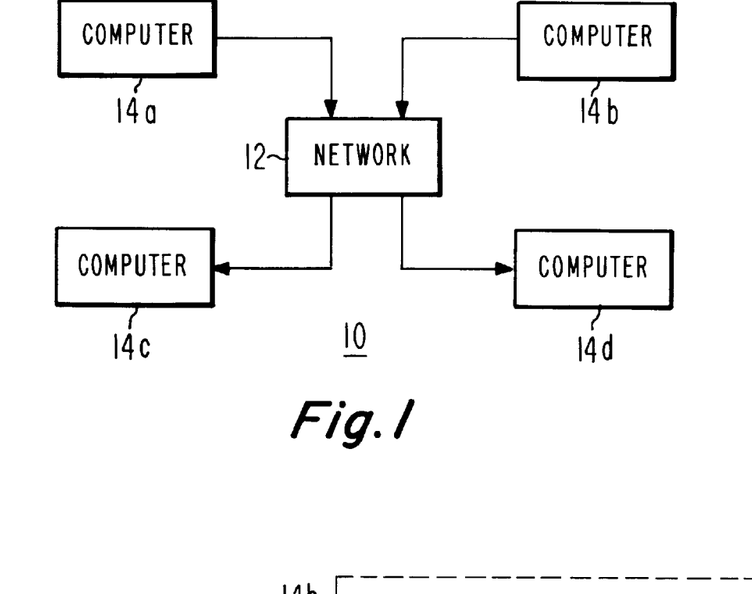
FIG. 1 is a simplified block diagram of a communication system which can use intelligent mobile agents, as described in the abovementioned Whitebread et al. application.

FIG. 1 illustrates a communication system designated generally as 10, which includes a network 12 and four representative network nodes with computers 14a, 14b, 14c, and 14d connected to the network, as described in the abovementioned Whitebread patent application. As mentioned above, each computer is capable of sending intelligent mobile agents out to any of the other three computers. Such mobile agents can be generated at each of computers 14 by the use of a language such as agent TCL, available from the computer science division of Dartmouth College, Dartmouth, N.H., and the mobile agent can be transmitted, by way of the network 12, to the other computers after its generation. The bandwidth of a network such as network 12 varies from about 4800 baud or bits-per-second to as much as tens of megabaud, and may vary within the network, depending upon which network branch is considered.

Figure 2:
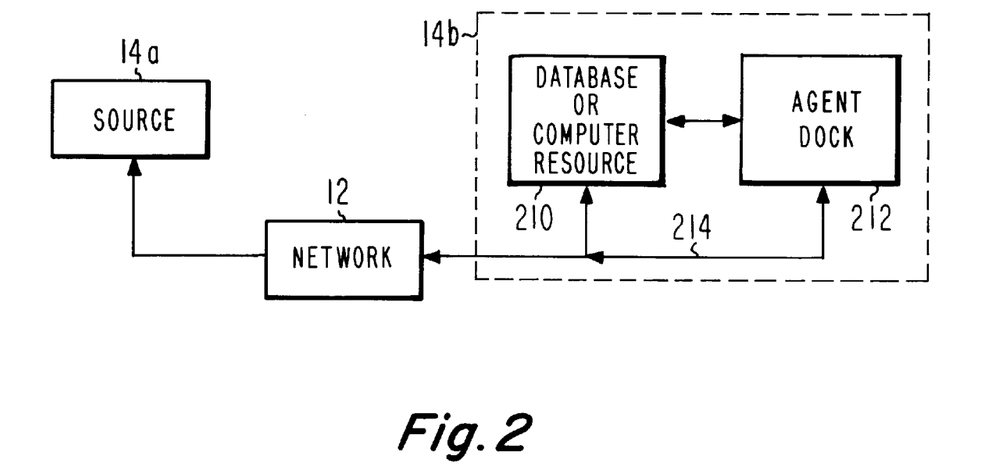
FIG. 2 is a simplified block diagram of a portion of the communication system of FIG. 1.

FIG. 2 is a simplified block diagram of an arrangement which is similar to a portion of the arrangement of FIG. 1. In FIG. 2, a source of intelligent mobile agents is illustrated as 14a, which is the same designation as that of computer 14a of FIG. 1. Element 14a of FIG. 2 is designated as a "source", because in the most basic system, it needs only to transmit or launch a mobile agent; it may, of course, have other capabilities. The active agent goes out onto the network from element 14a of FIG. 2, and performs its tasks, moving from computer to computer as necessary. If the mobile agent is programmed to return to source 14a when its task is completed, then source 14a must also be capable of receiving the information conveyed by the mobile agent. While source/sink 14a of FIG. 2 need not be a computer, it will ordinarily be such.

Also in FIG. 2, network 12 is connected to a second "computer" block 14b, which may include a database 210 and an agent dock 212. Database 210 may be simply a memory which can be accessed by an intelligent mobile agent, in which case block 14b must further include a processor or "computer", because the intelligent mobile agent must reside, at least temporarily, at location 14b. Instead of a database such as 210, agent dock 212 could be coupled to any other data or computing resource which is to be acted upon by an intelligent mobile agent. As also illustrated in FIG. 2, database 210 is coupled to agent dock 212, and the network 12 is also connected to agent dock 212.

The intelligent mobile agent is a program. In an ordinary computer system, blocks 210 and 212 of location 14b of FIG. 2 may be hardware, or they may be programs (software) which are resident at location 14b. Agent dock 212 of FIG. 2 has the ability to interface or interact with the intelligent mobile agent, and also provides the intelligent mobile agent with capabilities which reside at location 14b. Such capabilities might include access to knowledge bases, additional computational functions, and the like.

Figure 3:
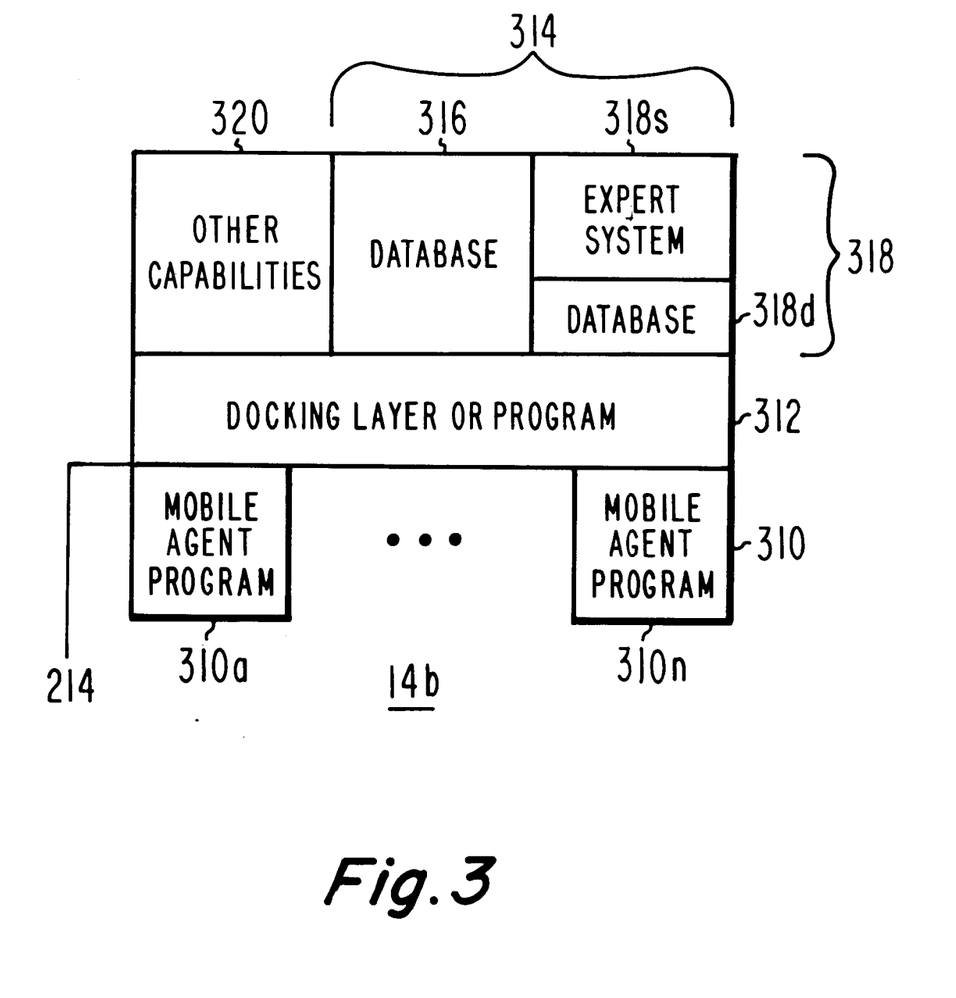
FIG. 3 is a simplified architecture diagram illustrating the relationship of the agent docking of FIG. 2 to the agent.

FIG. 3 is a simplified architecture diagram which represents the software in the agent dock 212 of FIG. 2. In FIG. 3, one or more intelligent mobile agents 310a, . . . , 310n appears at a layer 310 at the bottom of block 212, adjacent to the path 214 by which it (they) arrive at the dock. It should be recognized that at any particular time, the agent dock may have no mobile intelligent agents docked therewith, it may have only one, or it may have two or more. When docked, each mobile agent 310a, . . . , 310n interfaces with a docking software layer 312, which recognizes the presence of the mobile agent, and which enables the mobile agent by effectively "pushing its ON button", to cause the intelligent mobile agent to recognize that it has arrived at a new location, and to enable it to execute its program or instructions. Location 14b also includes a knowledge base illustrated as 314.

Following the turn-on or enabling of the then-resident intelligent mobile agent 310a, . . . , 310n of FIG. 3, the docking layer 312 acts as a service provider to the intelligent mobile agent 310a, . . . , 310n. For example, the (or one of the) intelligent mobile agent(s) may indicate to the docking layer that the mobile agent is a search agent which is looking for particular data. Such data, in a military context, might be the presence, location, or identity, or all of this information, relating to electromagnetic radiators which might have been located by specialized equipment available at location 14b. It may happen that the computer at location 14b has no specialized equipment for generating the type of data which the intelligent mobile agent seeks, in which case the docking layer 312 of FIG. 3 so advises the agent 310a, . . . , 310n. In that event, the agent may go elsewhere in the network (to another computer location 14a, 14b, 14c, 14d, . . . ; of FIG. 1), or return to its source with a failure message. On the other hand, if the docking layer 312 knows that such information is available in its knowledge base 314, it advises the intelligent mobile agent 310a, . . . , 310n, of that fact, and of other relevant capabilities available. For example, in the context of an electromagnetic emitter locator, location 14b might have a database 316 containing raw data representing frequency and pulse characteristics of a received electromagnetic signal, and might also have an expert system 318 which is capable of evaluating the raw data, and which may have already evaluated the raw data, and have identified an emitter as being, for example, a weather radar operating at a particular physical location (which, in general, is not the same as a network location). On the other hand, location 14b might have the raw data represented by database 316, and the knowledge base required as the foundation for an expert system for identifying the emitter, but might not include the expert system itself.

In general, expert systems include two distinct portions, namely a knowledge base and a decision-making portion. The decision-making portion is typically much smaller than the knowledge base. However, the knowledge base changes from time to time as more information becomes available, and as conditions change. For example, in the medical fields the knowledge about the symptoms and progress of newly discovered diseases and/or conditions may not be in an older knowledge base, but, when such information is included in an updated knowledge base, the same types of decision-making programs can operate on the updated information in order to identify, and suggest treatment for, such newly discovered diseases and/or conditions. Similarly, in the abovementioned military application, the knowledge base 318*d* of FIG. 3 can be updated with the operating frequency, pulse characteristics, and other spectral characteristics of new radar and other emitter types as they become known, which the decision-making portion 318*s* of the expert system can then use to identify this new type of radar if the raw data is indicative of its presence. Layer portion 320 represents other capabilities which might be available to the intelligent mobile agent.

Thus, the docking layer 312 of FIG. 3 "tells" the then-resident mobile agent or agents of layer 310*a*, . . . , 310*n*, about the existence of the raw data available in database 316, and of the existence of either the knowledge base 318*d* of, or of the entire expert system 318, and also about any other available capabilities 320 which are relevant to the task which the intelligent mobile agent has identified.

Once the intelligent mobile agent 310*a*, . . . , 310*n*, of FIG. 3 has received information from the docking layer about the available capabilities, the intelligent mobile agent decides, based upon its program, which of the locally available capabilities it wishes to avail itself of. The docking layer facilitates obtaining the information from the raw-data database or the expert system, or from a stand-alone knowledge base, as required.

The information in expert system database 318 of FIG. 3 can be updated in any of a number of ways. For example, the database 318*d* can be updated by occasional transmissions over the network 12. While these transmissions may require substantial bandwidth, they are performed infrequently, and may be performed at low data rates, over extended intervals during low-traffic times. In the arrangement of FIG. 3, the expert system and a current database therefor are available to the intelligent mobile agent, without transmitting the entire expert system and its database each time an inquiry is made by transmission of an intelligent mobile agent. The knowledge base 318*d* may be updated by a memory upload provided by a maintenance worker from a memory disk, or from any other physical media.

Figure 4:
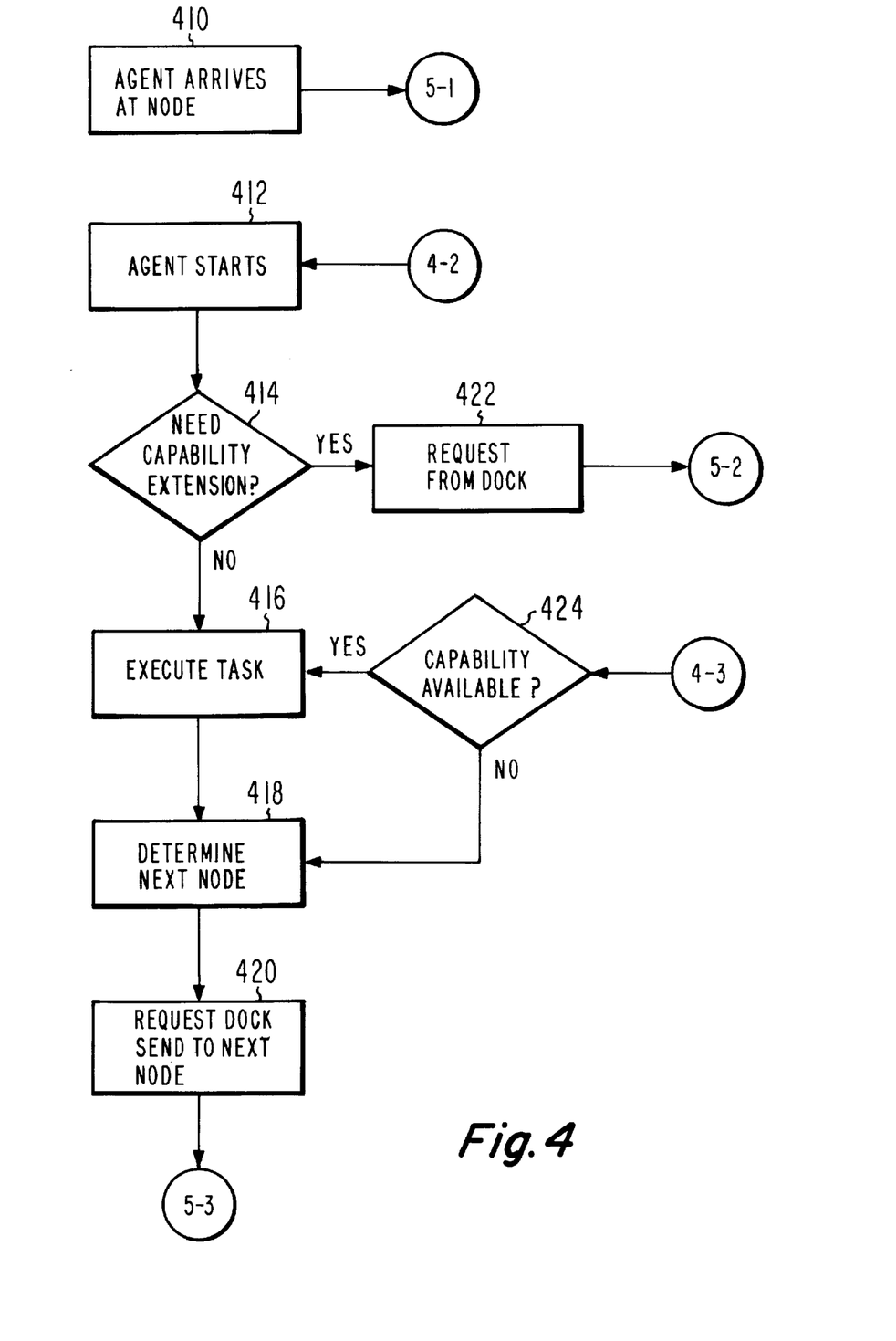
FIG. 4 is a simplified flow chart illustrating an intelligent mobile agent.
Figure 5:
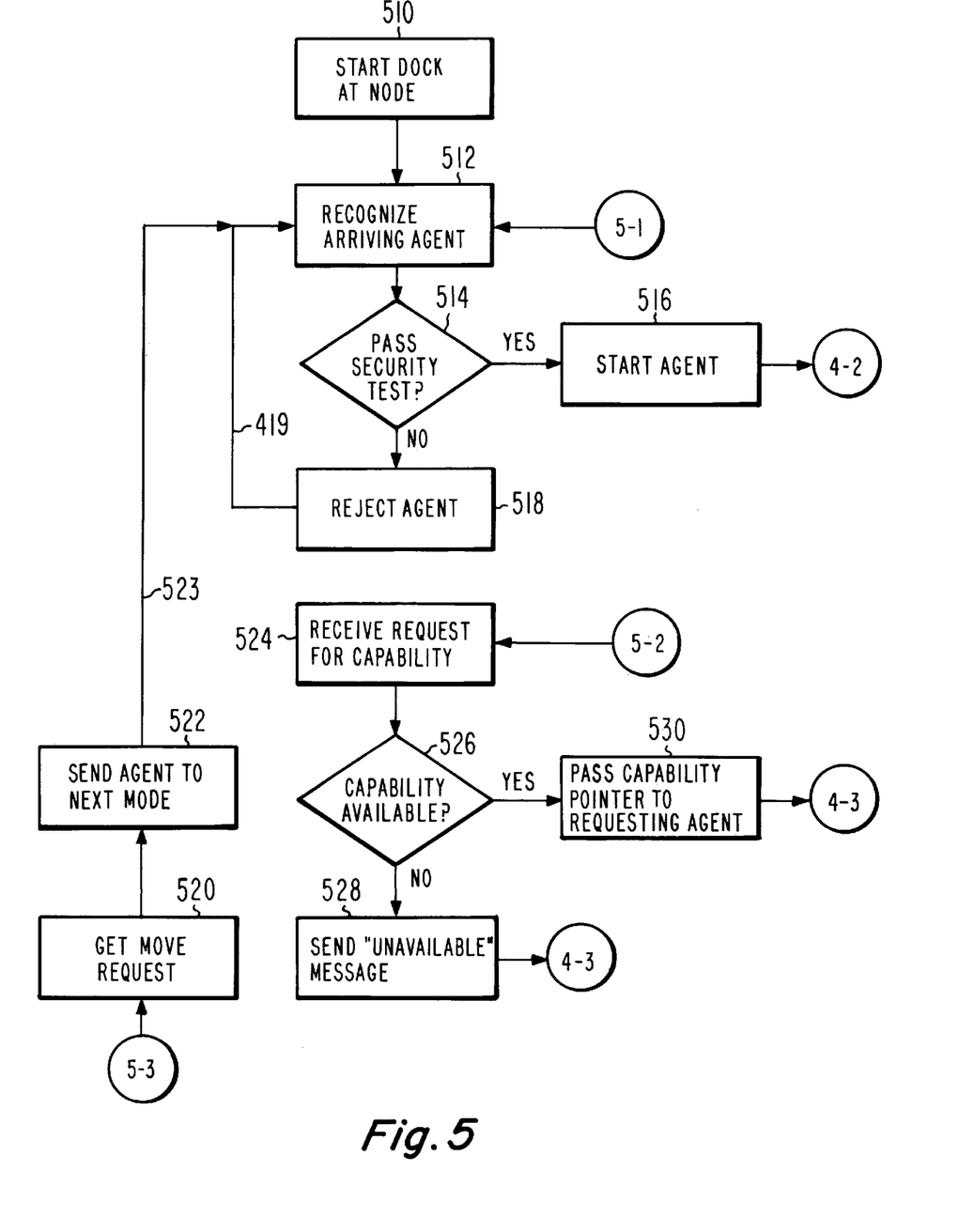
FIG. 5 is a simplified flow chart illustrating a docking layer such as that of FIG. 3.

FIG. 4 is a simplified flow chart illustrating the operation of a typical mobile agent 310*a*, . . . , 310*n*, as described in the abovementioned Whitebread patent application, and FIG. 5 is a simplified flow chart illustrating the operation of the docking system 312. The sequence of events begins with the arrival of a mobile agent at a network node (network site) or an agent dock, as suggested by block 410 of FIG. 4. The sequence representation then flows to a logic node 5-1, which represents a transfer of the sequence to a corresponding logic node 5-1 of FIG. 5. Logic block 510 represents a start point for the docking program, which starts up the logic, and then goes into a "wait" state, waiting for arrival of an agent at the node. From logic node 5-1 of FIG. 5, the logic flows to a block 512, which represents recognition by the logic flow of the docking system 312 that a mobile agent has arrived at the network node. The recognition represented by block 512 may be accompanied by a verification of a security code, following which the docking system logic flows to a decision block illustrated as 514. Decision block 514 decides whether the currently arrived agent has clearance to coact with this network node. If the mobile agent does not meet the security requirement, the logic leaves decision block 514 by the NO output, and flows to a block 518, which represents rejection of the mobile agent. The logic of the agent docking system then returns by a logic path 419 to block 512, whereupon the docking system continues to monitor for the appearance of an active agent at its network node.

If a mobile agent arrives at the network node and meets the established security criteria, the logic leaves decision block 514 of FIG. 5 by way of the YES output, and flows to a block 516, which represents a command for the starting of the mobile agent. From block 516, the logic flows by way of a logic node 4-2 to block 412 of FIG. 4. Block 412 of FIG. 4 represents the starting of the mobile agent in response to the command issued by logic block 516. From logic block 412, the logic flows to a decision block 414, which decides whether the mobile agent requires capability extension. This decision may be as simple as the examination of an "extension required" flag associated with the mobile agent. If no capability extension is required, the logic flows from decision block 414 by way of its NO output, and arrives at a block 416. Block 416 represents performance of the task assigned to the mobile agent by its internal programming. Once the task is completed, the logic flows from block 416 to a block 418. Since the mobile agent has completed its task, it must now decide whether it must return to the originating source with its data, or to seek more data by going on to a known further address, or search randomly by going to an address which has not yet been visited. Block 418 represents the decision as to where the mobile agent is to go next. From block 418, the logic flows to a block 420, which represents an instruction to the docking system to command the transmission of the mobile agent to the selected address. From logic block 420 of FIG. 4, the logic then flows by way of a logic node 5-3 to logic block 520 of FIG. 5, which represents acceptance of the direction to move the mobile agent to a defined network node. Block 522 represents the sending of the mobile agent to its next destination, and the logic then flows by way of a path 523 back to block 512.

In the event that the mobile agent requires extension of its capabilities, the logic flow is as described above until the logic arrives at decision block 414 of FIG. 4. In the case in which the mobile agent requires capability extension, the logic leaves decision block 414 by the YES output, and flows to a block 422, which represents making a request for a particular extension of capabilities from the docking system. It must be recognized that the network may have many nodes having different capabilities, and may have various kinds of mobile agents perambulating therethrough, seeking various different types of capabilities, not all of which are available at each network node. From block 422 of FIG. 4, the logic flows by way of a logic node 5-2 to a block 524 of FIG. 5. Block 524 represents the reception of a request for a particular type of extension capability. From block 524, the logic of the docking system flows to a decision block 526, which looks through its index of available capabilities to see if the requested capability is available. If the capability is not available at this particular network node, the logic leaves decision block 526 by the NO output, and flows to a block 528, which represents the sending of a "not available" signal to the mobile agent. From block 528 of FIG. 5, the control flows by way of a logic node 4-3 to decision block 424 of FIG. 4. Since the capability sought by the mobile agent is not available at this particular network node, the logic of the mobile agent leaves decision block 424 by the NO output, and flows to block 418. As described above, block 418 represents the determination of the location of the next network node to be visited by the mobile agent; from block 418, the logic passes through the states represented by logic blocks or nodes 420, 5-3, 520, and 522, back to block 512, which represents a "waiting for a mobile agent" state of the docking system.

As so far described, the cases which have been discussed in relation to FIGS. 4 and 5 are those in which (a) the mobile agent was not authorized to act, and was rejected; (b) was authorized to act, but did not require capability extension; (c) was authorized to act, and required capability extension, but the particular capability extension was not available at the network node or site. The next possibility is that the mobile agent arriving at the network node is authorized, requires capability, and the capability is available. In this last case, the logic will arrive at decision block 526 of FIG. 5 as described above, but, since the requested capability is available, the logic will leave by the YES output, rather than NO. From the YES output of decision block 526, the logic flows to a block 530, which represents the passing of a capability pointer to the requesting mobile agent. Logic node 4-3 returns the sequence flow to decision block 424 of FIG. 4, whereupon the logic leaves decision block 424 by the YES output, and flows to block 416, which as mentioned above represents the performance of the task, which presumably also means availing itself of the extended capabilities at the network node.

Thus, the arrangement described in the abovementioned Whitebread et al. application allows highly capable intelligent agents of relatively small size to be transmitted over limited-bandwidth networks for performing their functions, with the extended capabilities being made available at the appropriate remote network locations. Portable storage media may be used to take extended capability information to each computer remote computer. In some cases, it may instead be desirable to load the extended capability information into the computer by using the limited-bandwidth network, albeit at a data rate commensurate with network capabilities, by transmission over a period of time, preferably at a time when the network is lightly loaded.

Figure 6:
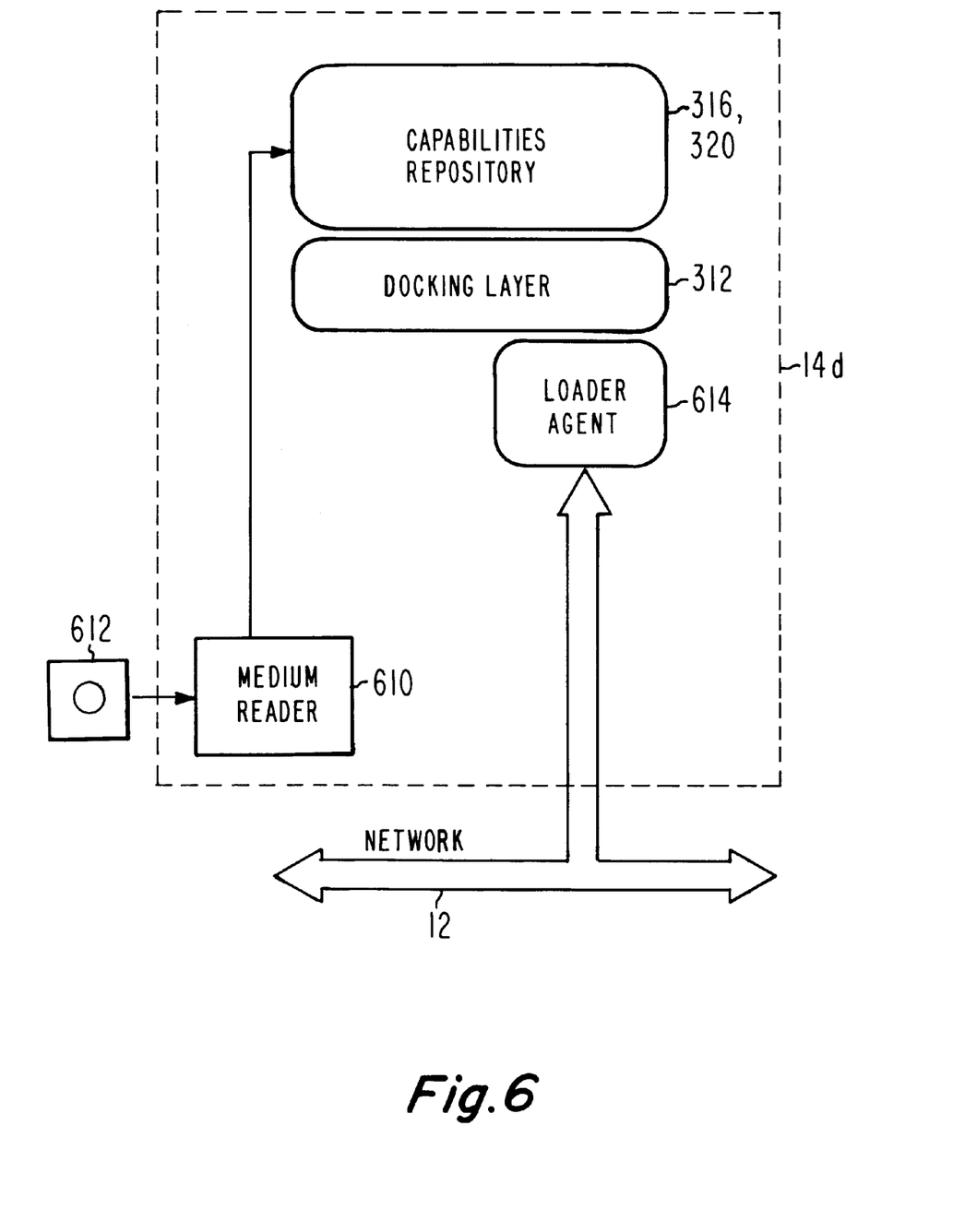
FIG. 6 is a simplified block diagram illustrating various arrangements for loading extended capability information into a computer at a remote location on the network.

FIG. 6 is a simplified block diagram illustrating three different arrangements for loading extended capability information into a computer at a remote location on the network so that it may be accessed by the docking system of that computer in response to the docking of a mobile agent. In FIG. 6, representative node 14d includes a medium reader, such as a floppy-disk reader 610, which is coupled to a capabilities repository, corresponding to the database, expert system, or the like of FIG. 3. Updates of the capability can be manually transported to the node on a data medium, illustrated as a floppy disk 612, and uploaded by means of the reader 610. Control could be accomplished manually by an operator at a remote site, with the delivery of the update information being performed over the network. It will be clear that updates over the network must be accomplished in the presence of sufficient security to guarantee that unwanted intrusion does not occur. The physical transmission by way of a data medium may also require security measures to assure that the knowledge base is not updated by someone having physical access but without authority to update. Another way to update the knowledge base is by a mobile agent, illustrated as Loader Agent 614, which is especially adapted for uploading or deliver of such information from a remote site during periods of low traffic on the network.

While it is very desirable to be able to express highly capable mobile agents at remote nodes, it is also advantageous to be able to use the cooperation of multiple intelligent mobile agents to perform various tasks. Cooperation of multiple agents implies the transfer of information between the agents. The bandwidth limitation of the communication network prevents the mobile agents from carrying large amounts of information. Improved methods of exchange of information between intelligent mobile agents is desired.

SUMMARY OF THE INVENTION

A method according to the invention performs processing or information exchange on a distributed network of nodes by, or with, two or more intelligent mobile agents. Each of the nodes at which processing may be accomplished includes an intermediary module or program, corresponding to a docking module as described in the abovementioned Whitebread et al. patent application. The method includes various steps. Among the steps of the method is the step of selecting one compression algorithm from among the compression algorithms of a suite of compression algorithms, to thereby identify a selected compression algorithm. A compressed representation of a piece of information is generated by using the selected one of the compression algorithms. An information token is generated by attaching to the compressed piece of information a tag representing the identity of the selected compression algorithm used in the step of generating the compressed representation of the piece of information. The information token is attached to a first intelligent mobile agent. The first intelligent mobile agent is transmitted from a first one of the nodes in the system, together with its attached token, to at least a second node of the network. From a node in the network, which may be the first node or another node, a second intelligent mobile agent is transmitted to at least the second node of the network, whereby the first and second intelligent mobile agents reside at the second one of the nodes of the network, either simultaneously or sequentially. At the second node, the token is at least copied, or possibly transferred, from the first intelligent mobile agent to the intermediary module of the second node. In the intermediary module of the second node, the piece of information in the token is decompressed using the identity tag of the selected compression algorithm, to thereby produce a reconstituted piece of information. The reconstituted piece of information is copied or transferred to the second intelligent mobile agent. The second intelligent mobile agent then uses the reconstituted information to perform whatever task it is assigned to perform.

In a particular embodiment of the invention, the first mobile agent arrives at the second node at a time at which the second mobile agent is not yet at the node, and the method further includes the steps of, for the first mobile agent, resident at the second node, determining that the second mobile agent may eventually arrive at the second node, and deciding to leave a copy of the token at the second node. In response to the decision to leave a copy of the token, the first mobile agent leaves a copy of the token with the intermediary module at the second node. In a preferred embodiment of the invention, the intermediary module of the second node leaves the token compressed until that later time at which arrival is identified, at the second node, of an intelligent mobile agent which can make use of the piece of information. When arrival of such an intelligent mobile agent is identified, the piece of information is decompressed to produce the decompressed piece of information, using the identity tag of the selected compression algorithm to select the appropriate decompression algorithm. The reconstituted piece of information is then copied, or possibly transferred, to the second intelligent mobile agent.

Preliminary steps which may be appropriate include the step of transmitting to at least the second node of the network at least some of the decompression algorithms of a suite of decompression algorithms. These decompression algorithms have the capability to decompress corresponding ones of the compression algorithms of the suite of compression algorithms. This should include the decompression algorithm for the selected compression algorithm, and should also include the identifying tags necessary to allow the proper decompression algorithm to be used.

DESCRIPTION OF THE INVENTION

The first step in performing the method in accordance with the invention is to transmit to at least the relevant nodes 14a, 14b, 14c, 14d, . . . of the network copies of decompression algorithms, together with identification indicia by which the decompression algorithms can be individually identified. The decompression algorithms may include algorithms operable to decompress information compressed by compression algorithms which have the properties, for example, of (a) maximum compression, regardless of time required for processing, which might be used for the very largest files or information to be transmitted over the network, to thereby minimize the size of the file, to thereby minimize transmission time, (b) minimum compression and/ or decompression time, which might be useful for moderate-size information which is time-sensitive, (c) greatest efficiency in compressing particular types or formats of data. It is useful to note that different users of the network might have different ideas as to what constitutes a large or a moderate-size file, and so might choose different compression/decompression algorithms for what might appear on the surface to be the same reasons. Thus, each node of the system might have many different decompression algorithms stored in its database, with each different user of the network using only one or a few of those available. Each decompression algorithm so stored is marked with an identifier. Examples of such compression/ decompression algorithms include those known as "Lempel-Ziv" and "Huffman," but the invention is not dependent on the exact type of algorithm.

A user wishing to transmit an intelligent mobile agent with appended information, such as the expert system mentioned above as an example, then encodes the information using the most appropriate one of the suite of compression algorithms available to him, and applies the appropriate compression method identifier to the encoded information, to form a token. The token include the compressed information to be transmitted, together with the decompression algorithm identifier. The token is then appended to the mobile intelligent agent, and transmitted onto the network, where it moves from place to place attempting to fulfill its preprogrammed function.

As described above in relation to FIGS. 4 and 5, if the intelligent mobile agent arriving at a network node is authorized to access the node, requires capability, and the capability is available, the docking layer 312 of software provides access to the capability by transferring a pointer to the intelligent mobile agent. In the context of this invention, the capability which is made available to the intelligent mobile agent may include a decompression algorithm identified by the identifier accompanying the (or one of the) token(s) carried by the intelligent mobile agent.

Figure 7:
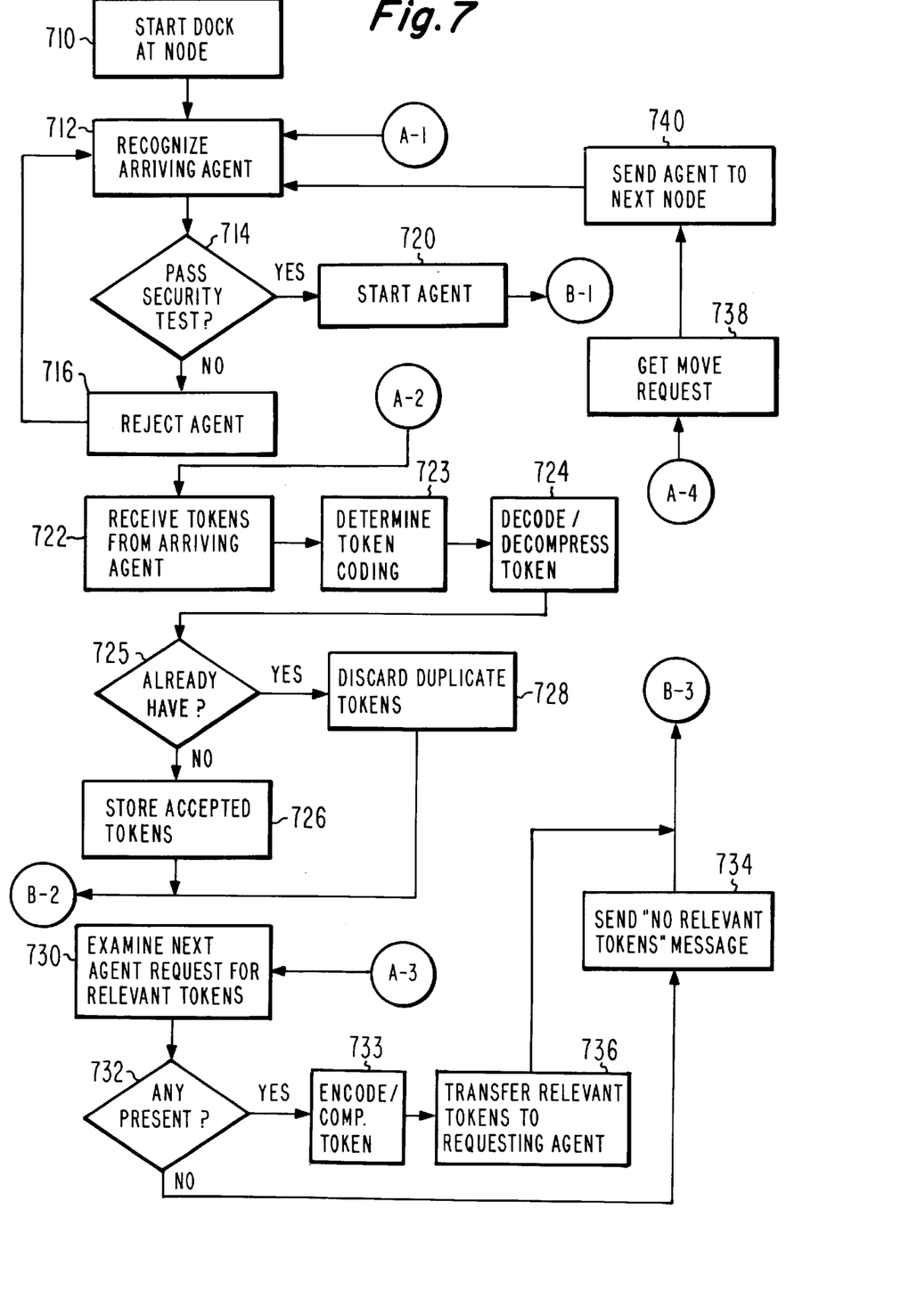
FIG. 7 is a simplified flow chart of the operation of a dock in accordance with an aspect of the invention, for co-acting with intelligent mobile agents which may carry tokens from one location to another.

In FIG. 7, the dock software token processing starts at a START block 710, and proceeds to a logic block illustrated as a block 712, which represents waiting for, and recognizing the arrival of an intelligent mobile agent at the node. The logic will remain in block 712 until an intelligent mobile agent arrives and is recognized.

Figure 8:
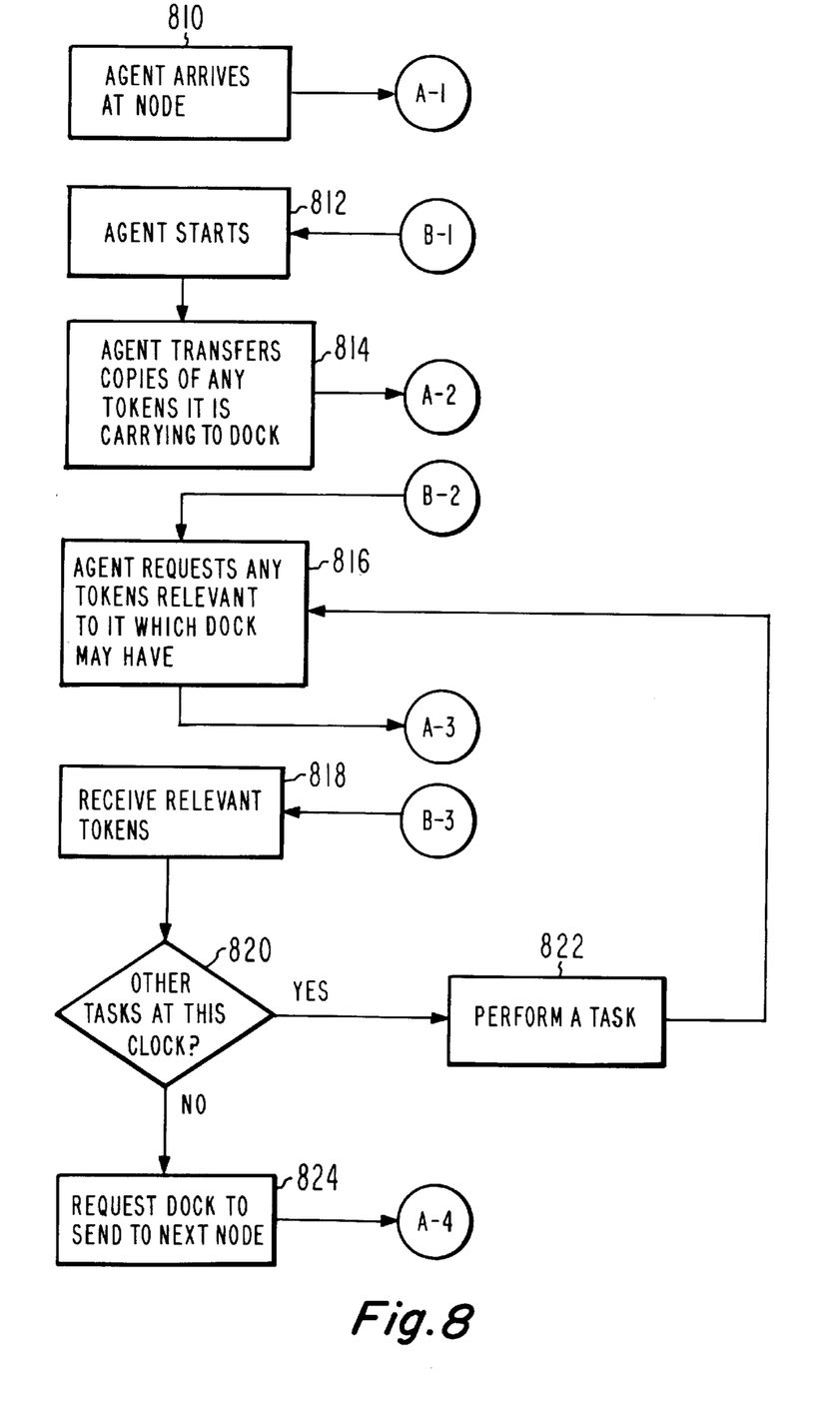
FIG. 8 is a simplified flow chart of the operation of an intelligent mobile agent in accordance with an aspect of the invention, which may carry one or more tokens from one location to another.

The arrival of an intelligent mobile agent at a dock is represented by block 810 of FIG. 8. From logic block 810 of FIG. 8, the logic flows by way of a logic node A-1 to a logic block 712 of FIG. 7. When an agent arrives at the dock, the dock logic of FIG. 7 flows from block 712 to a decision block 714, which represents the result of a security test. If the agent has no authority to act in relation to the node, the logic flows by the NO logic output of decision block 714 to a block 716, which represents rejection of the agent, and the dock logic loops back to waiting block 712 by way of a logic path 718. If the intelligent mobile agent is authorized to act, the logic leaves decision block 714 by the YES logic output, and flows to a block 720, which represents a command to start the intelligent mobile agent.

From block 720 of FIG. 7, the logic flows by way of a logic node B-1 to block 812 of the agent logic flow of FIG. 8. Block 812 represents the starting of the docked intelligent mobile agent. From block 812, the logic of the agent flows to a block 814, which represents transfer to the dock of a copy of each token carried by the docked agent. From block 814, the logic flows or transfers by way of a logic node A-2 to a block 722 of FIG. 7. Block 722 of FIG. 7 represents the reception of a token at the dock. The logic flows from block 722 to a block 723, which represents examination of the token to determine the type of algorithm by which the token was coded. Block 724 represents the decoding or decompression of the token by the appropriate one of the algorithms, to recover plain text. When the token has been received and decoded, it is examined in a decision block 725 to determine if the dock already has a copy of this token. In making the evaluation, the date on which the token was generated should be taken into consideration; a different date may represent a different token notwithstanding the same name.

If the token is not already available to the dock, the logic flows from the NO output port of decision block 725 to a further logic block 726, which represents the placing of the token into a memory for storage therein. The logic leaves block 726 and flows to the intelligent mobile agent by way of a logic node B-2. If the token is already available to the dock when the decision is made in decision block 725 the logic flows to logic node B-2 by way of a block 728, which represents the discarding of the superfluous token.

From logic node B-2 of the agent logic of FIG. 8, the logic flows to a block 816, which represents a request by the agent directed to the dock for transfer to the agent of appropriate tokens. In order to allow the dock to know what the agent considers to be relevant, the request by the agent includes interest area descriptors such as (a) age range of the token which is of interest to the agent, (b) time or date of recording of the data in the token, (c) key-words, subjects or terms of interest, or (d) token date or geographic range of interest. With such information from the agent, the dock can readily select tokens containing the desired information. From block 816, the logic is transferred by way of a logic node A-3 to a block 730 of FIG. 7, representing examination at the dock of the agent's request for tokens, to determine if any of the available tokens meet the stated needs of the agent. From block 730, the logic flows to a decision block 732. If a token is available which should be transferred to the mobile agent at its request, the logic leaves decision block 732 by the YES output, and flows to a further block 733, which represents the encoding or compression of the token to be transferred to the mobile agent, if not already encoded. The logic then flows to a block 736, which represents the transfer of the encoded relevant token to the requesting agent. From block 736, the logic flows by way of a logic node B-3 to the agent. If no token is available to the dock which should be transferred to the intelligent mobile agent docked therewith, the logic of FIG. 7 leaves decision block 732 by the NO output, and flows to a block 734, which represents the sending of a NO RELEVANT TOKENS message to the docked agent. From block 734, the logic returns to the agent by way of logic node B-3. Thus, regardless of whether there is or is not a token to be transferred from the dock to the agent, the logic flows back to the agent by way of logic node B-3.

From logic node B-3 of FIG. 8, the logic flows to block 818, which represents the receipt of the token. From logic block 820, the logic flows to a decision block 820, which represents a decision as to whether the agent has additional tasks to perform at the location of this dock. If the task involves the information stored in the token, there must be an instruction to the dock to decode the token, and to make the decoded token available to the agent so the agent can use it to perform its tasks. If the decompression may take a long time, it may be desirable for the dock to immediately begin decoding the token's information, so the dock always has the compressed token available for transfer, and its decompressed equivalent available for immediate use by a potential user agent.

The performing of the docked intelligent mobile agent's task is represented by block 822 of FIG. 8. Block 822 may be considered to be simply an interrupt, which is closed when the task has been completed. From block 822, the logic flows back to block 816, which, as mentioned above, represents a request to the dock for any additional relevant tokens, and continues on the logic path described following block 816. On the other hand, decision block 820 will ultimately decide that the intelligent mobile agent has no further tasks to accomplish at this location, and the logic flows from the NO output of decision block 824 to a block 824, which represents a command to the dock to send the intelligent mobile agent to the next location or network node.

From block 824, the logic returns by a logic node A-4 to control by the dock, at block 738 of FIG. 7, which represents receipt of the request to move the intelligent mobile agent to a node, normally specified by the intelligent mobile agent. From block 738, the logic flows to a block 740, representing the sending of the requesting agent to the next network node. The logic of the dock then flows back to block 712.

Thus, a method according to the invention performs processing on a distributed network (10) of network nodes (14*a*, 14*b*, 14*c*, 14*d*) by, or with the use of, two or more intelligent mobile agents (310*a*, . . . , 310*n*). Each of the network nodes (14) at which processing may be accomplished includes an intermediary module (312) or dock program. The method includes various steps. Among the steps of the method is the step of selecting one compression algorithm from among the compression algorithms of a suite of compression algorithms, to thereby identify a selected compression algorithm. A compressed representation of a piece of information is generated by using the selected one of the compression algorithms. An information token is generated by attaching to the compressed piece of information a tag representing the identity of the selected compression algorithm used in the step of generating the compressed representation of the piece of information. The information token is attached to a first intelligent mobile agent. The first intelligent mobile agent is transmitted from a first one of the nodes (14*a*) in the system, together with its attached token, to at least a second node (14*b*, 14*c*, 14*d*, . . . ) of the network (10). From a node in the network, which may be the first node or another node, a second intelligent mobile agent is transmitted to at least the second node of the network, whereby the first and second intelligent mobile agents reside at the second one of the nodes of the network, either simultaneously or sequentially. At the second node, the token is at least copied, or possibly transferred, from the first intelligent mobile agent to the intermediary module of the second node. In the intermediary module of the second node, the piece of information in the token is decompressed using the identity tag of the selected compression algorithm, to thereby produce a reconstituted piece of information. The reconstituted piece of information is copied or transferred to the second intelligent mobile agent. The second intelligent mobile agent then uses the reconstituted information to perform whatever task it is assigned to perform.

In a particular embodiment of the invention, the first mobile agent arrives at the second node at a time at which the second mobile agent is not yet at the node, and the method further includes the steps of, for (or at) the first mobile agent, resident at the second node, determining that the second mobile agent may eventually arrive at the second node, W and deciding to leave a copy of the token at the second node. In response to the decision to leave a copy of the token, the first mobile agent leaves a copy of the token with the intermediary module at the second node. In a preferred embodiment of the invention, the intermediary module of the second node leaves the token compressed until that later time at which arrival, at the second node, is identified of an intelligent mobile agent which can make use of the piece of information. When arrival of such an intelligent mobile agent is identified, the piece of information is decompressed to produce the decompressed piece of information, using the identity tag of the selected compression algorithm to select the appropriate decompression algorithm. The reconstituted piece of information is then copied, or possibly transferred, to the second intelligent mobile agent.

Preliminary steps which may be appropriate include the step of transmitting to at least the second node of the network at least some of the decompression algorithms of a suite of decompression algorithms. These decompression algorithms decompress corresponding ones of the compression algorithms of the suite of compression algorithms. This should include the decompression algorithm for the selected compression algorithm, and should also include the identifying tags necessary to allow the proper decompression algorithm to be used.

Other embodiments of the invention will be apparent to those skilled in the art. For example, tokens might take a number of different forms ranging from compressed raw data to pointers or addresses of data, to high-level summarizations of information, to interrelated hierarchies or aggregations of other tokens, and the like. Agents might aid in optimizing the distribution by registering their interest areas with the docks, and by carrying tokens to other docks at which requests for related tokens occur. Agents and docks might enter into sophisticated joint analysis of tokens that don't exactly match the agent's stated need, but which, through information transformation, may be useful to the agent.

What is claimed is:

1. A method for performing, by the use of plural intelligent mobile agents, processing on a distributed network of nodes, each of which includes an intermediary module, said method comprising the steps of:

selecting one compression algorithm from among the compression algorithms of a suite of compression algorithms to thereby identify a selected compression algorithm;

generating a compressed representation of a piece of information using said selected compression algorithm, to thereby generate a compressed piece of information;

generating an information token by attaching to said compressed piece of information the identity of said selected compression algorithm used in said step of generating a compressed representation;

attaching said information token to a first intelligent mobile agent;

from one of said nodes in the system, transmitting said first intelligent mobile agent, together with its attached token, to at least a second one of said nodes of said network;

from a node in said system, transmitting a second intelligent mobile agent to at least said second one of said nodes of said network, whereby said first and second intelligent mobile agents reside at said second one of said nodes of said network;

at said second node, at least copying said token from said first intelligent mobile agent to said intermediary module of said second node;

in said intermediary module of said second node, decompressing said piece of information in said token using said identity of said selected compression algorithm, to thereby produce a reconstituted piece of information;

at least copying said reconstituted piece of information to said second intelligent mobile agent.

2. A method according to claim 1, wherein said first mobile agent arrives at said second node at a time at which said second mobile agent is not at said node, said method further comprising the steps of:

at said first mobile agent, determining that said second mobile agent may eventually arrive at said second node, to thereby decide to leave a copy of said token at said second node;

at said first mobile agent, leaving a copy of said token with said intermediary module at said second node in response to said decision to leave a copy.

3. A method according to claim 2, wherein said method further comprises the steps of:

at said intermediary module of said second node, storing said token until that time at which arrival is identified of an intelligent mobile agent which can make use of said piece of information;

at said intermediary module, decompressing said piece of information in said token using said identity of said selected compression algorithm, to thereby produce at said time a reconstituted piece of information; and at least copying said reconstituted piece of information to said second intelligent mobile agent.

4. A method according to claim 1, further comprising the preliminary steps of:

transmitting to at least said second node at least some decompression algorithms, which decompress corresponding ones of said compression algorithms of said suite of compression algorithms, including said selected compression algorithm, together with their corresponding identifications.

* * * * *